United States Patent [19]

Okabe et al.

[11] Patent Number: 5,609,911
[45] Date of Patent: Mar. 11, 1997

[54] PRODUCTION OF CERAMIC MATERIAL POWDER

[75] Inventors: Shinsei Okabe, Takatsuki; Shunsuke Nakaya, Omihachiman; Yukio Hamaji, Otsu; Masami Yabuuchi, Yokaichi, all of Japan

[73] Assignee: Murata Manufacturing Co., Ltd., Japan

[21] Appl. No.: 503,990

[22] Filed: Jul. 19, 1995

[30] Foreign Application Priority Data

Jul. 19, 1994 [JP] Japan .................................. 6-166881

[51] Int. Cl.$^6$ .......................................................... B05D 7/00
[52] U.S. Cl. ............................ 427/212; 427/215; 427/220; 264/56; 264/63; 501/137
[58] Field of Search .................................. 427/215, 220, 427/212; 264/56, 63; 501/137

[56] References Cited

U.S. PATENT DOCUMENTS 5,082,607  1/1992  Tange et al. ................................. 264/44
5,102,592  4/1992  McCauley et al. ......................... 264/56

FOREIGN PATENT DOCUMENTS 0431999  6/1991  France .
9113042  5/1991  WIPO .

OTHER PUBLICATIONS

Derwent Publications Ltd., London, GB; AN 81–50868D and JP–A–56 061 782 (Matsushita, 27 May 1981 Abstract.

Primary Examiner—Michael Lusignan
Assistant Examiner—David M. Maiorana
Attorney, Agent, or Firm—Ostrolenk, Faber, Gerb & Soffen, LLP

[57] ABSTRACT

Powder of ceramic materials is produced by mixing a powder of a basic ceramic composition, a solvent and a surfactant to prepare a slurry, adding at least one unsaturated fatty acid salt containing an additive metal element to the resultant slurry, polymerizing the at least one unsaturated fatty acid salt with a polymerization initiator to form a polymer of at least one unsaturated fatty acid salt, drying the resultant slurry to form a layer of the resultant polymer on particle surfaces of the basic ceramic composition, and then calcining the resultant coated powder of the basic ceramic composition.

19 Claims, No Drawings

5,609,911

PRODUCTION OF CERAMIC MATERIAL POWDER

BACKGROUND OF THE INVENTION

1. Field of the Invention

The present invention relates to production of ceramic material powder and, more particularly, to a method for producing ceramic material powders useful as a material for ceramic electronic parts.

2. Description of the Prior Art in general, ceramic electronic parts have been produced by using a ceramic composition prepared by incorporating additional metal elements into a basic ceramic composition to improve electric characteristics and sintering property of the ceramics. Such additional metal elements or additives have been incorporated into a basic composition such as, for example, a dielectric ceramic composition of barium titanate by forming a coating of compounds of the additives on surfaces of individual particles of the basic ceramic composition. The coating of the compounds of the additives is generally formed on individual particle surfaces by the following three methods:

(1) a dry method including the steps of mixing carbonates or oxides of additive metal elements with a powder of a basic composition of a ceramic dielectric, grounding the resultant mixture, and calcining the mixture;

(2) a wet process including the steps of adding an aqueous solution containing ions of additive metal elements to a slurry of a basic composition of a ceramic dielectric, adding a precipitant to the mixture to form precipitates of metal ions, filtering off the resultant mixture, drying and then calcining the same; and (3) a spray method including the steps of mixing a powder of a basic composition with an organic binder and an aqueous solution of metal compounds of additives to prepare a slurry, spray-drying the resultant slurry to prepare granules, and then calcining the resultant granules.

However, these methods have the following disadvantages awaiting a solution. For the dry method, it is impossible to homogeneously and microscopically disperse carbonates or oxides of the additives between powders of the basic ceramic composition because of large particle sizes of the additives. This causes local non-uniformity in concentration of the additives in the basic ceramic composition, which in turn causes wide variations in electric characteristics of the ceramic electronic parts, thus making it difficult to obtain desired characteristics.

The dispersion of the additives is improved by the wet process at a certain degree, but it is insufficient for the production of ceramic electronic parts with desired characteristics. In addition, it is difficult to precipitate all the additive ions simultaneously by addition of one precipitant. For example, ions of Sr, Ca and Mg can be precipitated as a complex carbonate by reactions with carbonic acid ions ($CO^{-2}$), but $Ti^4$ ions and the like can not be precipitated by reaction with carbonic acid ions. Since alkali metals have bad influences on the electrical properties of the ceramic electronic parts, it is preferred to avoid use of alkali salts as the precipitant. However, if an ammonium salt containing no alkali metal is used as a precipitant, some metal elements such as Zn, Mn, Ni and Co form soluble amine complex salts, thus making it impossible to produce precipitates of compounds of these metal.

The spray method occasionally causes production of gel by interaction between the binder and anions or cations present in the mixture for preparation of the slurry, thus making it impossible to prepare particles of the basic composition uniformly covered with additives to uniformly adhere to particle surfaces of a basic composition.

SUMMARY OF THE INVENTION

It is therefore an object of the present invention to provide a method for producing powder of ceramic material, which overcomes the aforesaid disadvantages and makes it possible to produce a powder of ceramic material of which individual particles are uniformly covered with an oxide layer of metal elements to be incorporated into a basic composition to improve electrical characteristics of a basic ceramic composition.

The above and other objects of the present invention are achieved by providing a method for producing powder of ceramic material, comprising the steps of mixing a powder of a basic ceramic composition, a solvent and a surfactant to prepare a slurry, adding at least one unsaturated fatty acid salt containing an additive metal element to said slurry, polymerizing said at least one unsaturated fatty acid salt with a polymerization initiator to form a polymer of said at least one unsaturated fatty acid salt, drying the resultant slurry to form a layer of the resultant polymer on particle surfaces of said basic ceramic composition, and then calcining the resultant coated powder of said basic ceramic composition.

The surfactant is at least one material selected from the group consisting of ionic surfactant, nonionic surfactant and amphoteric surfactant. A preferred solvent is water or an organic solvent having a boiling point of 100° C. and above.

The polymer of at least one fatty acid salt is preferably produced by radical reactions employing an organic peroxide as a polymerization initiator. Typical peroxide initiators include acetyl peroxide, α, α'-azobisisobutyronitrile, t-butyl hydroperoxide, cumene hydroperoxide, di-t-butyl hydroperoxide, azodichlorohexylcarbonitrile, and succinate peroxide.

The polymer of at least one fatty acid salt includes at least one compound which, when calcined, forms a double-layered structure or a core-shell structure by reaction with the basic ceramic composition.

The polymer of at least one fatty acid salt includes at least one compound which, when calcined, forms a vitreous ingredient serving as a sintering promoter for the basic ceramic composition.

The preferred fatty acid metal salt having an unsaturated bond and containing metal elements of an additive are radically polymerizable, monoene- or diene type unsaturated fatty acid salts. Preferred monoene type unsaturated fatty acid salts are salts of an unsaturated fatty acid having one carbon double bond and having 3 to 30 carbon atoms. Typical monoene type unsaturated fatty acids include, without being limited to, acrylic acid, caproleic acid, myristoleic acid, oleic acid, palmitoleic acid, and undecylenic acid. Preferred diene type unsaturated fatty acid is an unsaturated fatty acid having two carbon double bonds and having 6 to 18 carbon atoms. Typical diene type unsaturated fatty acids include, without being limited to, sorbic acid, and linoleic acid. Other unsaturated fatty acids such as, triene type, tetraene type, pentaene type and hexaene type unsaturated fatty acids can not be used as a material for unsaturated fatty acid salts which are radically unpolymerizable.

As the surfactant, any kind of conventionally known surface active agents such as ionic surfactant, nonionic surfactant and amphoteric surfactant may be used alone or in combination. Typical ionic surfactants include carboxylate, sulfonate, sulfates, phosphates, aliphatic amine salts and ammonium salts thereof, aromatic quaternary ammonium salts, and heterocyclic quaternary ammonium salts.

Typical nonionic surfactants include, without being limited to, polyoxyethylene alkyl ether, straight chain polyoxyethylene alkyl ether, polyoxyethylene secondary alcohol ether, polyoxyethylene alkyl phenyl ether, polyoxyethylene glycerol fatty ester, polyoxyethylene solbitane fatty ester, polyoxyethylene glycol fatty ester, propylene glycol fatty ester, fatty alkanolamide, polyoxyethylene fatty amide, and polyoxyethylene alkyl amine.

Typical amphoteric surfactants include, without being limited to, carboxybetaine, sulphobetaine, amino carboxylic acid, and imidazoline derivatives.

It is preferred to use an organic solvent having a boiling point of 100° C. and above to prevent the solvent from evaporation during polymerization as well as to make it easy to handle. In order to facilitate the drying process of the slurry after polymerization, however, it is preferred to use an organic solvent having a boiling point of 150° C. or below.

Typical organic solvents which suit these conditions are alcoholic solvents such as isobutyl alcohol, propargyl alcohol, n-butyl alcohol and isopentyl alcohol; aromatic solvents such as xylene, ethylbenzene and toluene; ketonic solvents such as isopropyl acetone; and ester solvents such as butyl acetate, ethylbutylate, and isoamyl acetate.

The additive is one or more metal elements used to improve electrical properties and sintering properties of the basic ceramic composition. The metal elements to be used include Ba, Ca, Sr, Mg, Zr, Ti, Nb, Co, Ni, Sn, Y, Mn, Fe, Si, Al, Pb, B and rare earth elements such as Ce, Nd, Er, and Dy. These metal elements are added to the basic ceramic composition singly or in combination as the occasion demands.

A preferred basic ceramic composition is barium titanate, lead titanate, and the like.

In the method of the present invention, the basic ceramic composition powder is mixed with a surfactant in a solvent and fractured into fine particles by milling the mixture in the solvent. Since the surfactant adheres to particle surfaces of the basic ceramic composition, particles of the basic ceramic composition are uniformly dispersed in the solvent without causing aggregation, thus making it possible to obtain a slurry in which the particles are uniformly dispersed without causing aggregation.

The above and other objects, features and advantages of the present invention will become apparent from the following description in connection with several examples.

EXAMPLE 1

A slurry containing suspended particles of barium titanate (a basic ceramic composition) was prepared by placing 100 parts by weight of $BaTiO_3$, 0.2 parts by weight (in terms of effective components) of an anionic surfactant (carboxylic acid-type polymeric surfactant), 200 parts by weight of a solvent (a mixture of xylene and toluene in the weight ratio of 1:1), and 300 parts by weight of partially stabilized zirconia beads (5 mm in diameter) in a polyethylene pot, and mixing the mixture for 16 hours.

The resultant slurry was wholly transferred into a separable flask and mixed with 0.0193 mol of cerium methacrylate and 0.0193 mol of titanium methacrylate. After benzoyl peroxide was added to the resultant mixture as a polymerization initiator in an amount of 0.1 part by weight per 100 parts by weight of the methacrylate, the separable flask was placed in a mantle heater, provided with a condenser, and kept at 65° C. for 16 hours by flowing cooling water to the condenser, whereby polymerizing cerium methacrylate and titanium methacrylate with stirring to deposit a polymer of cerium and titanium methacrylate on particle surfaces of barium titanate.

After the conclusion of polymerization, the reaction product was cooled to room temperature, transferred into a rotary evaporator, and dried at 70° C. and under a reduced pressure of 50 Torr to remove the mixed solvent.

The resultant dried powder was calcined at 1000° C. The powder obtained was barium titanate containing 4.5 mol % of Ce.

Mapping analysis by X-ray microanalyzer (XMA) was performed to determine the dispersive state of Ce on particle surfaces of the resultant powder. The XMA analysis showed that Ce is uniformly distributed on particle surfaces of barium titanate as no segregation of Ce was observed.

EXAMPLE 2

Using barium titanate as a basic ceramic composition, there was prepared a slurry containing barium titanate suspended in a solvent by mixing 100 parts by weight of $BaTiO_3$, 0.2 parts by weight (in terms of effective components) of an anionic surfactant (carboxylic acid-type polymeric surfactant), 200 parts by weight of a mixed solvent of xylene and toluene (weight ratio, 1:1), and 300 parts by weight of partially stabilized zirconia beads (5 mm in diameter and mixed) by means of a polyethylene pot for 16 hours.

The resultant slurry was wholly transferred into a separable flask of 1000 ml, and mixed with cobalt acrylate (0.05 g in terms of cobalt oxide), niobium acrylate (2.00 g in terms of niobium oxide), and neodymium acrylate (0.60 g in terms of neodymium oxide). After benzoyl peroxide was added as a polymerization initiator to the resultant mixture in an amount of 0.1 part by weight per 100 parts by weight of the methacrylate, the separable flask was placed in a mantle heater, provided with a condenser, and then kept at 65° C. for 16 hours by flowing a cooling water to the condenser to polymerize the acrylate with stirring, whereby depositing an acrylate polymer on particle surfaces of barium titanate.

After the conclusion of polymerization, the reaction product was cooled to room temperature, transferred into a rotary evaporator, and dried at 70° C. and under a reduced pressure of 50 Torr to remove the mixed solvent.

The resultant dried powder was calcined at 1050° C., whereby a powder of barium titanate containing Nb, Co and Nd was obtained.

The dispersive state of Nb, Co and Nd on particle surfaces of the resultant powder was analyzed with an X-ray microanalyzer (XMA) and a surface layer of the particles was observed by the transmission electron microscope (TEM).

The XMA analysis showed that Nb, Co and Nd are uniformly distributed on particle surfaces of barium titanate without being segregated. The TEM analysis showed that particles of the resultant barium titanate powder have a core-shell structure consisting of a core particle of barium titanate and a thin layer or shell of oxides of Nb, Co and Nd uniformly deposited thereon.

What is claimed:

1. A method for producing powder of ceramic materials, comprising the steps of mixing a powder of a titanate ceramic composition, an organic solvent and a surfactant to prepare a slurry, adding at least one unsaturated fatty acid salt containing an additive metal element therein to the resultant slurry, polymerizing said at least one unsaturated fatty acid salt with a polymerization initiator to form a polymer of said at least one unsaturated fatty acid salt, drying the resultant slurry to form a layer of the resultant polymer on particle surfaces of said titanate ceramic composition, and then calcining the resultant coated powder of said titanate ceramic composition.

2. The method for producing powder of ceramic materials according to claim 1 wherein said surfactant is at least one material selected from the group consisting of ionic surfactant, nonionic surfactant and amphoteric surfactant.

3. The method for producing powder of ceramic materials according to claim 1 wherein said solvent has a boiling point of 100° C. and above.

4. The method for producing powder of ceramic materials according to claim 1 wherein said polymer of at least one fatty acid salt is produced by radical reactions employing an organic peroxide as a polymerization initiator.

5. The method for producing powder of ceramic materials according to claim 1 wherein said polymer of at least one fatty acid salt includes at least one compound which, when calcined, forms a double-layered structure or a core-shell structure by reaction with the basic ceramic composition.

6. The method for producing powder of ceramic materials according to claim 1 wherein said polymer of at least one fatty acid salt includes at least one compound which, when calcined, forms a vitreous ingredient serving as a sintering promoter for the basic ceramic composition.

7. The method for producing powder of ceramic materials according to claim 1 wherein said titanate ceramic composition is barium titanate or lead titanate.

8. The method for producing powder of ceramic materials according to claim 1 wherein said at least one unsaturated fatty acid salt is a monoene or diene and contains one or more metal elements selected from the group consisting of Ba, Ca, Sr, Mg, Zr, Ti, Nb, Co, Ni, Sn, Y, Mn, Fe, Si, Al, Pb, B and rare earth elements.

9. The method for producing powder of ceramic materials according to claim 8 wherein said solvent has a boiling point of 100° C. to 150° C.

10. The method for producing powder of ceramic materials according to claim 3 wherein said solvent has a boiling point of 150° C. or less.

11. A method for producing a modified barium titanate ceramic powder, comprising the steps of:

mixing a barium titanate powder, a surfactant and an organic solvent having a boiling point of 100° to 150° C. to prepare a slurry;

adding at least one unsaturated fatty acid salt containing at least one additive metal element to the resultant slurry, said at least one additive metal element being selected from the group consisting of Ba, Ca, Sr, Mg, Zr, Ti, Nb, Co, Ni, Sn, Y, Mn, Fe, Si, Al, Pb, B and rare earth metals;

polymerizing said unsaturated fatty acid salt with a polymerization initiator to form a polymer of said unsaturated fatty acid salt;

drying the resultant slurry to form a layer of the resultant polymer on particle surfaces of said basic ceramic composition; and then calcining the resultant coated powder of said ceramic composition.

12. The method for producing powder of ceramic materials according to claim 11 wherein said solvent is at least one organic solvent selected from the group consisting of alcoholic solvents, aromatic solvents, ketonic solvents and ester solvents.

13. The method for producing powder of ceramic materials according to claim 12 wherein said alcoholic solvent is selected from the group consisting of isobutyl alcohol, propargyl alcohol, n-butyl alcohol and isopentyl alcohol.

14. The method for producing powder of ceramic materials according to claim 12 wherein said aromatic solvent is selected from the group consisting of xylene, ethylbenzene and toluene.

15. The method for producing powder of ceramic materials according to claim 12 wherein said ketonic solvent is isopropyl acetone.

16. The method for producing powder of ceramic materials according to claim 12 wherein said ester solvent is selected from the group consisting of butyl acetate, ethyl butylate and isoamyl acetate.

17. The method of producing ceramic powder according to claim 12 wherein said fatty acid salt is a 3 to 30 carboatom monoene or 6 to 18 carbon atom diene and said surfactant is anionic.

18. The method of producing ceramic powder according to claim 17 wherein said metal element comprises cerium, cobalt, nobium or neodymyum, and the solvent is a mixture of toluene and xylene.

19. The method of producing ceramic powder according to claim 18 in which the fatty acid salt containing at least one additive metal element which is added to the slurry is a combination of cerium methacrylate and titanium methacrylate or a combination of cobalt acrylate, nobium acrylate and neodymyum acrylate.

* * * * *